(12) United States Patent
Nakaso et al.

(10) Patent No.: US 9,792,070 B2
(45) Date of Patent: Oct. 17, 2017

(54) DATA STORAGE DEVICE, METHOD OF STORING DATA, AND ON-VEHICLE CONTROL APPARATUS

(71) Applicants: FUJITSU TEN LIMITED, Kobe-shi, Hyogo (JP); TOYOTA JIDOSHA KABUSHIKI KAISHA, Toyota-shi, Aichi (JP)

(72) Inventors: Yoshiaki Nakaso, Kobe (JP); Yuko Ando, Kobe (JP); Ryoh Suzuki, Kobe (JP); Ichiro Kitaori, Nagoya (JP); Ryuichi Wada, Nagoya (JP)

(73) Assignees: FUJITSU TEN LIMITED, Kobe-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 14/774,541

(22) PCT Filed: Dec. 12, 2013

(86) PCT No.: PCT/JP2013/083393
§ 371 (c)(1),
(2) Date: Sep. 10, 2015

(87) PCT Pub. No.: WO2014/147906
PCT Pub. Date: Sep. 25, 2014

(65) Prior Publication Data
US 2016/0034226 A1    Feb. 4, 2016

(30) Foreign Application Priority Data

Mar. 18, 2013 (JP) ................... 2013-054879

(51) Int. Cl.
*G06F 11/00* (2006.01)
*G06F 3/06* (2006.01)
*G06F 11/14* (2006.01)

(52) U.S. Cl.
CPC .......... *G06F 3/0652* (2013.01); *G06F 3/0619* (2013.01); *G06F 3/0653* (2013.01);
(Continued)

(58) Field of Classification Search
CPC .... G06F 11/14; G06F 11/1402; G06F 11/141; G06F 11/1438; G06F 11/1415; G06F 11/1474; G06F 11/1441
See application file for complete search history.

(56) References Cited

U.S. PATENT DOCUMENTS 6,834,331 B1 * 12/2004 Liu ................. G06F 11/1417
711/103
2002/0116588 A1 * 8/2002 Beckert ............. G06F 11/1441
711/161
(Continued)

FOREIGN PATENT DOCUMENTS

JP    H11-120085 A    4/1999
JP    2006-298261 A   11/2006
(Continued)

OTHER PUBLICATIONS

March 2, 2016 extended Search Report issued in European Patent Application No. 13878987.0.
(Continued)

*Primary Examiner* — Philip Guyton
(74) *Attorney, Agent, or Firm* — Oliff PLC

(57) ABSTRACT

A memory having a plurality of storage blocks, and a memory control unit, are included, and each of the storage blocks is partitioned into a management data area and an actual data area. The management data area stores therein writing-in-progress management data indicating that writing of actual data has started, validity management data indicating that the writing of the actual data has been completed, and pre-erasure management data indicating that stored
(Continued)

actual data have been brought into an erasable state. The memory control unit determines, based on a storage state of the management data, the storage block storing therein the latest data.

7 Claims, 11 Drawing Sheets

(52) U.S. Cl.
CPC .......... *G06F 3/0659* (2013.01); *G06F 3/0679* (2013.01); *G06F 11/1441* (2013.01); *G06F 11/1474* (2013.01)

(56) References Cited

U.S. PATENT DOCUMENTS

| | | | | |
|---|---|---|---|---|
| 2005/0144366 | A1* | 6/2005 | Fuse | G06F 11/073 711/103 |
| 2005/0188250 | A1* | 8/2005 | Kurita | G06F 11/1435 714/6.1 |
| 2006/0259718 | A1* | 11/2006 | Paley | G06F 11/1072 711/159 |
| 2008/0250188 | A1* | 10/2008 | Nakanishi | G06F 11/1441 711/1 |
| 2009/0198931 | A1* | 8/2009 | Ohyama | G06F 1/30 711/162 |
| 2014/0269053 | A1* | 9/2014 | Chen | G11C 7/24 365/185.03 |

FOREIGN PATENT DOCUMENTS

| | | |
|---|---|---|
| JP | 2008-159013 A | 7/2008 |
| JP | 2009-223435 A | 10/2009 |
| JP | 2011-175361 A | 9/2011 |
| JP | 2012-181577 A | 9/2012 |
| JP | 2013-003869 A | 1/2013 |

OTHER PUBLICATIONS

Feb. 18, 2014 Written Opinion issued in International Patent Application No. PCT/JP2013/083393.
Feb. 18, 2014 International Search Report issued in International Patent Application No. PCT/JP2013/083393.
Oct. 7, 2014 Office Action issued in Japaneese Patent Application No. 2013-054879.
Jul. 1, 2014 Office Action issued in Japaneese Patent Application No. 2013-054879.

* cited by examiner

FIG.11

| INSTANTANEOUS FAILURE TIMING | (a) | (b) | (c) | (d) | (e) | (f) | (g) |
|---|---|---|---|---|---|---|---|
| BLOCK STATE | (1) VALID / (2) ERASURE COMPLETED | (1) VALID / (2) WRITING IN PROGRESS | (1) VALID / (2) WRITING IN PROGRESS | (1) VALID / (2) WRITING IN PROGRESS | (1) PRE-ERASURE / (2) WRITING IN PROGRESS | (1) ERASURE-IN-PROGRESS / (2) VALID | (1) ERASURE COMPLETED / (2) VALID |
| READ VALUE | BLOCK (1) | BLOCK (1) | BLOCK (1) | BLOCK (1) | BLOCK (1) | BLOCK (2) | BLOCK (2) |
| BLOCK NEEDED TO BE ERASED | NONE | BLOCK (2) | BLOCK (2) | BLOCK (2) | BLOCK (2) | BLOCK (1) | NONE |

RECEPTION OF REQUEST →

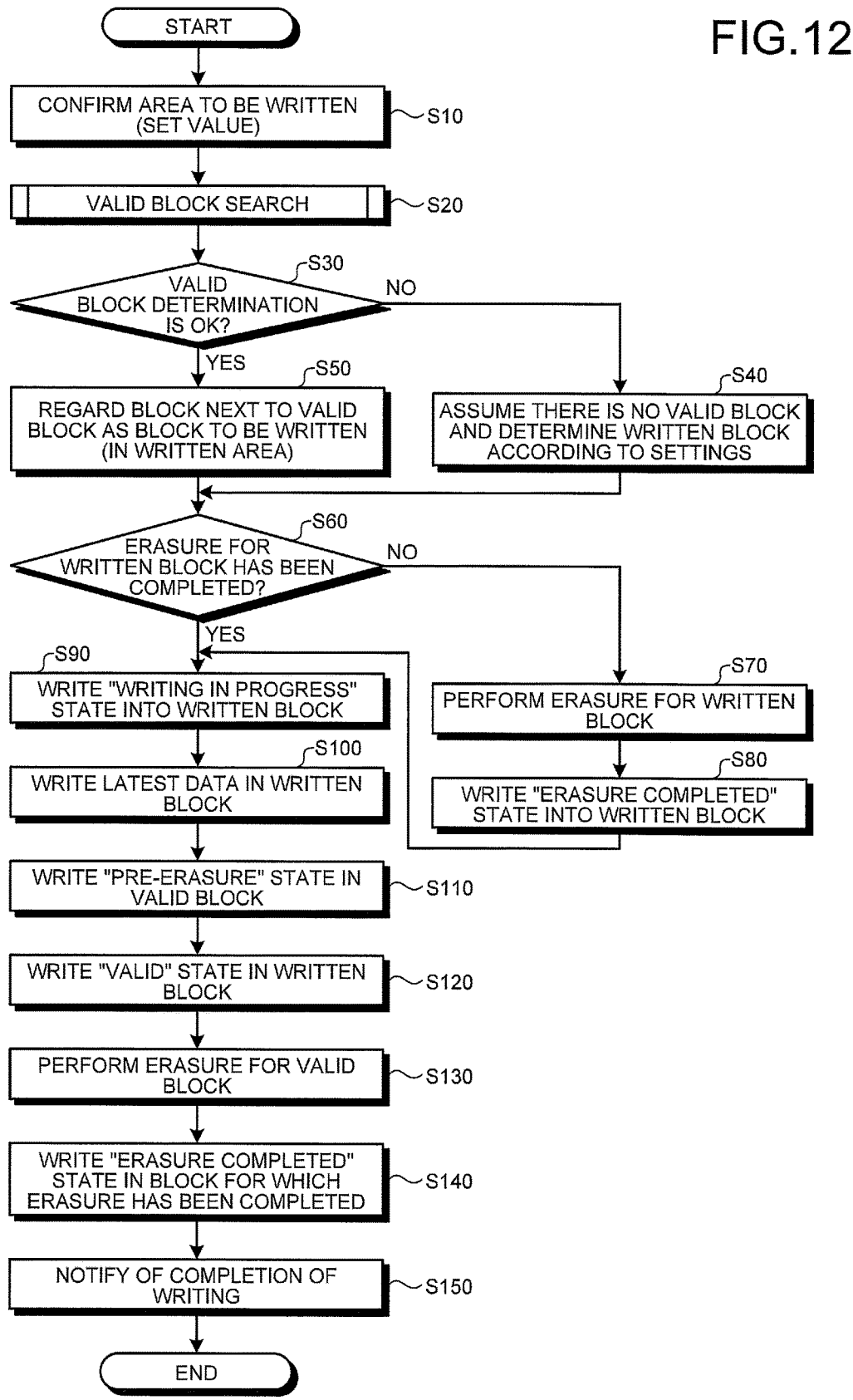

DATA STORAGE DEVICE, METHOD OF STORING DATA, AND ON-VEHICLE CONTROL APPARATUS

CROSS-REFERENCE TO RELATED APPLICATIONS

This application is national stage application of International Application No. PCT/JP2013/083393, filed on Dec. 12, 2013, which designates the United States, incorporated herein by reference, and which claims the benefit of priority from Japanese Patent Application No. 2013-054879, filed on Mar. 18, 2013, the entire contents of which are incorporated herein by reference.

FIELD

The present invention relates to a data storage device, a method of storing data, and an on-vehicle control apparatus.

BACKGROUND

In recent years, flash memories having high cost-performances have been widely used as nonvolatile memories.

A flash memory is divided into a plurality of storage blocks, and writing of data per storage unit (for example, per record) in the storage blocks and erasure of data per storage block are possible, but if an instantaneous power failure occurs, abnormal termination of the writing or erasure of data occurs and there is a risk that data loss may be caused.

Thus, in flash memories, old data are erased after new data are written. In an example of control of such a flash memory, when a storage block to be written is to be changed, as flag information indicating a state of each storage block, management information, such as: "update started" and "update finished" flags storing a start and a finish of the change processing for an old storage block; an "erasure finished" flag storing that erasure has finished for a storage block to be subjected to erasure; and the like, is stored and based on the management information, updating, writing, erasure, or the like for a memory is performed (for example, see Patent Literature 1).

CITATION LIST

Patent Literature

Patent Literature 1: Japanese Laid-open Patent Publication No. 2011-175361

SUMMARY

Technical Problem

However, according to the above mentioned conventional technique, depending on timing at which an instantaneous power failure occurs and a system to be applied to, such as a way of performing write processing, there is a possibility that which storage block includes data that are the usable latest data may be unable to be determined after a power recovery.

Solution to Problem

According to an aspect of an embodiment, a data storage device that performs data storage control for a memory, which has a plurality of storage blocks, for which update by overwrite of data is not possible, and for which erasure needs to be performed in units of the storage blocks when data are erased therefrom, the data storage device includes: a memory having a plurality of storage blocks each provided with an actual data area storing therein actual data; and a memory control unit that performs control of at least one of writing and reading with respect to the memory, wherein a management data area storing therein management data for management is provided in the memory, the management data area is configured to be able to store therein writing-in-progress management data indicating that writing of actual data has started, alidity management data indicating that the writing of the actual data has been completed, and pre-erasure management data indicating that stored actual data have been brought into an erasable state, and the memory control unit determines, based on a storage state of the management data in the management data area, the storage block storing therein the latest data.

BRIEF DESCRIPTION OF DRAWINGS

FIG. 11 is a diagram illustrating a relation between the data update processing and instantaneous failure timing according to the modified example.

FIG. 12 is a diagram illustrating an example of a flow of write processing according to the embodiment.

DESCRIPTION OF EMBODIMENTS

Hereinafter, with reference to the appended drawings, a data storage device, a method of storing data, and an on-vehicle control apparatus according to an embodiment will be described specifically. Further, hereinafter, a flash memory will be described as an example of a storage medium of the data storage device, and this flash memory will described as being provided in a microcomputer. However, the present invention is not to be limited by the following embodiment.

Figure 1:
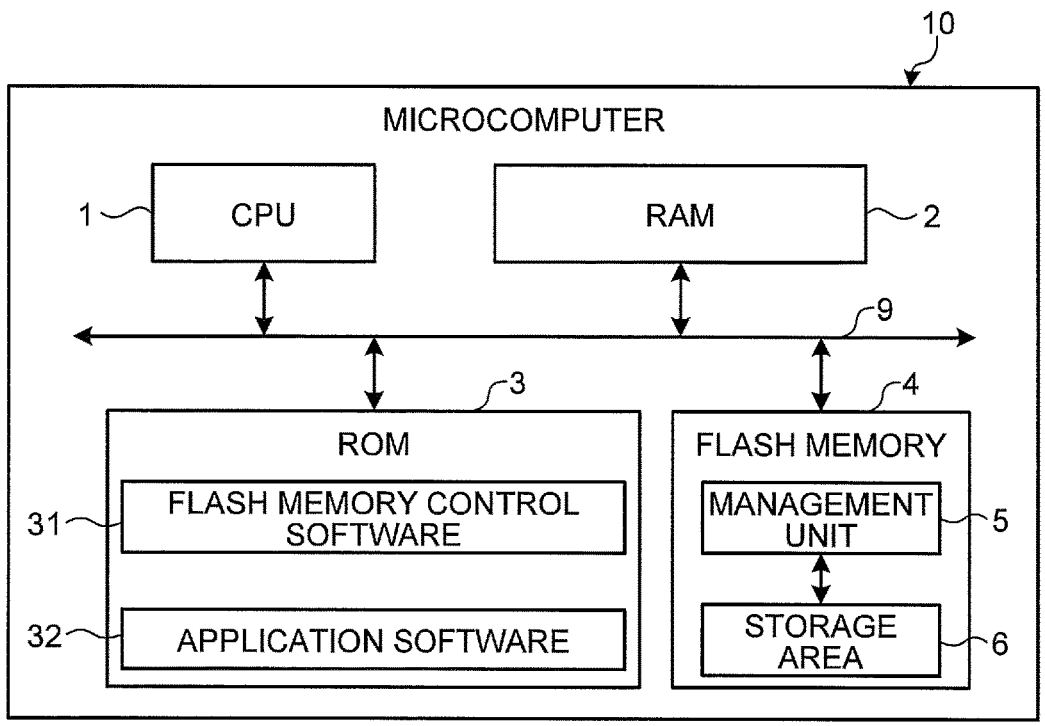
FIG. 1 is a block diagram illustrating an outline of a microcomputer including a data storage device according to an embodiment.
Figure 2:
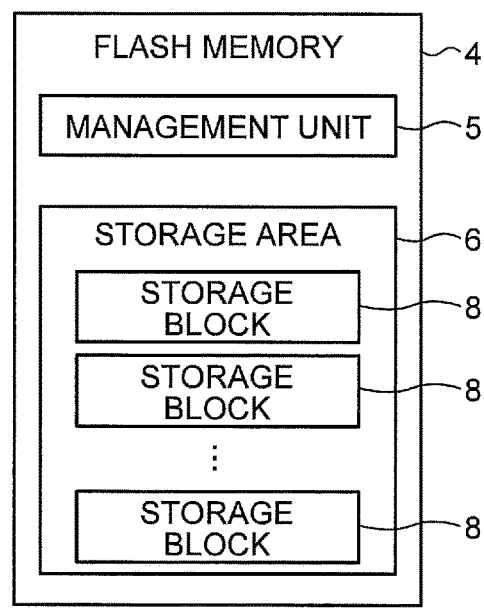
FIG. 2 is a block diagram illustrating an outline of a flash memory, which is the data storage device according to the embodiment.

First, the data storage device according to the embodiment will be described by use of FIG. 1 and FIG. 2. FIG. 1 is a block diagram illustrating an outline of a microcomputer 10 including a flash memory 4, which is a data storage medium, and FIG. 2 is a block diagram illustrating an outline of the flash memory 4.

The microcomputer 10 in this embodiment is an example of the data storage device and is assumed to be provided in an electronic control unit (ECU) that controls an engine of au automobile. The electronic control unit (ECU) is an example of the on-vehicle control apparatus.

As illustrated in FIG. 1, the microcomputer 10, which is the data storage device, includes a CPU 1, which is an example of a memory control unit, a RAM 2, a ROM 3, and the flash memory 4, and these are connected to one another via an internal bus 9.

The RAM 2 has an area storing therein targeted data, and an area storing therein the same data as data stored in a management data area 81 set in a storage block 8 (FIG. 2) of the flash memory 4. Further, the ROM 3 stores therein flash memory control software 31 and application software 32. The flash memory control software 31 is firmware of the flash memory 4, and is software for performing control, such as writing and erasure of data with respect to the flash memory 4. Furthermore, the application software 32 is function control software that performs control processing of an electronic device or the like, which is installed in an automobile, and the application software 32 is, for example, software that performs control of an engine.

The flash memory 4 is a nonvolatile memory for which additional storage of data is possible but for which update by overwrite of data is not possible, and thus is configured to, when there is no longer an unwritten area in a storage block 8 that is being written, collectively erase the original storage block 8 after writing, as necessary, partial necessary data (for example, the latest data) of data stored in the original storage block 8 into another unwritten storage block 8.

In detail, the flash memory 4 is able to rewrite "1" to "0" per storage unit (for example, per record) smaller than a storage block unit, but is able to rewrite "0" to "1" only per block unit (a unit in which the collective erasure is performed).

As illustrated in FIG. 1 and FIG. 2, the flash memory 4 has: a storage area 6 provided with a plurality of storage blocks 8 (FIG. 2); and a management unit 5 that manages and controls update operation and the like with respect to this storage area 6. The flash memory 4 referred to herein includes, not only a storage medium, but also a memory control function that performs control, such as simple writing and reading with respect to the storage medium, based on instructions from outside. That is, the management unit 5 may be an example of the memory control unit.

In other words, the management unit 5 performs, according to a data write request, a data read request, a data erasure request, and the like from the CPU 1, writing of data, reading of data, erasure of data, and the like with respect to the plurality of storage blocks 8 set in the storage area 6.

If a storage block 8 to be written is to be changed when there is a write request or when there is no longer an unwritten area in the storage block 8 being written, while existing data that have been written in the past in the storage block 8 (the storage block 8 storing therein old data) that has been a target to be written but no longer has the unwritten area are left therein, partial necessary data in the existing data or new data are written into another storage block 8, and after the writing, the data in the storage block 8 (the storage block 8 storing therein the old data) that no longer has the unwritten area are erased.

Figure 3:
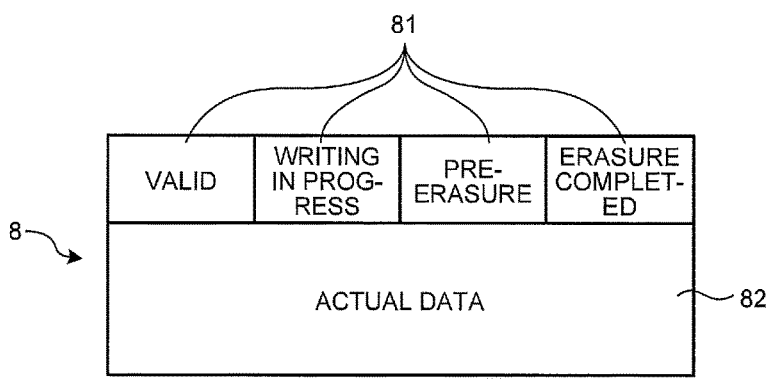
FIG. 3 is a block diagram illustrating an outline of a storage block according to the embodiment.

With reference to FIG. 3, an internal configuration of a storage block 8 included in the flash memory 4 will be described. FIG. 3 is a block diagram illustrating an outline of a storage block according to the embodiment.

As illustrated in FIG. 3, the storage block 8 is partitioned into a management data area 81 and an actual data area 82. The actual data area 82 stores therein, for example, automobile's driving history data stored in the RAM 2, various learning values of control data, abnormal value data detected by various sensors (diagnosis data and freeze frame data), and the like at predetermined timing.

The management data area 81 is partitioned further into four subregions as zoned areas and the following four types of management data are caused to be stored with one-to-one correspondence with the respective subregions. That is, for the four subregions of the management data area 81 in FIG. 3, the following data are stored from the left.

(1) Validity management data indicating that writing of actual data has been completed.
(2) Writing-in-progress management data indicating that writing of actual data is in progress (writing has started).
(3) Pre-erasure management data indicating that erasure for a storage block has started (erasure is in progress) and stored data have been brought into an erasable state.
(4) Completion-of-erasure management data indicating that erasure for a storage block has been completed.

"Actual data" referred to in (1) and (2) above means data (the above mentioned partial necessary data of the existing data, new data, or the like) to be written into a new storage block 8 (new storage block) when a storage block 8 to be written is changed. Since there may be a case where erasure processing is not performed immediately after the writing of actual data in (2) above, the pre-erasure management data may be said to be management data indicating that stored actual data have been brought into a state of being able to be subjected to erasure processing (have reached an erasure preparation stage).

As described above, the management data are written and stored in order into the four subregions instead of being overwritten.

By causing the management data to be respectively stored in the storage block 8, even if there is an instantaneous power failure (instantaneous power interruption) during update operation or the like, for example, after a power recovery, a storage block 8 of the latest data that are usable is able to be determined. Further, whether bad data have been generated by the instantaneous power failure is able to be determined.

Therefore, the flash memory 4 becomes highly reliable, and there is no risk that a life cycle of the storage block 8 and thus a life cycle of the flash memory 4 is shortened by erroneous overwrite or the like to the storage block 8.

Figure 4:
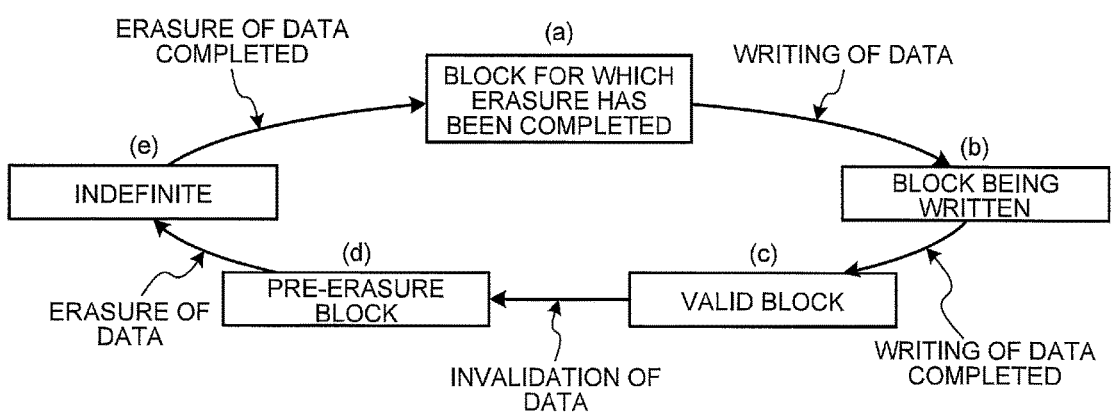
FIG. 4 is a diagram illustrating a sequential flow of data update processing according to the embodiment.
Figure 5:
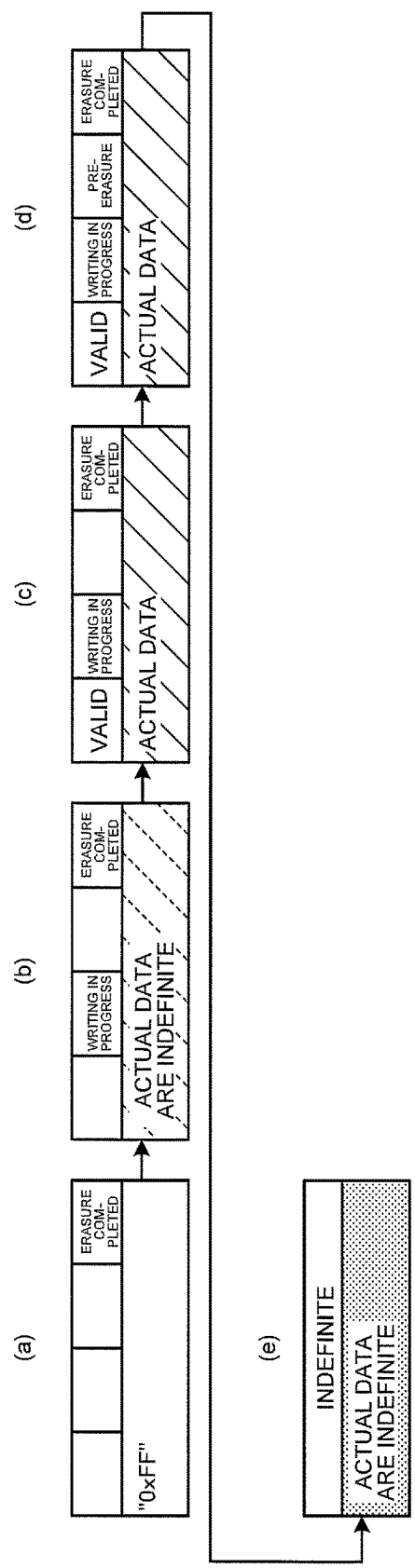
FIG. 5 is a diagram illustrating change of states of a storage block along with execution of the data update processing according to the embodiment.

FIG. 4 is a diagram illustrating a sequential flow of data update processing according to the embodiment, and FIG. 5 is a diagram illustrating change of states of a storage block along with execution of the data update processing according to the embodiment. As illustrated in the figures, the storage block 8 repeats five statuses while storing the management data. Thus, by using the flash memory control software 31 stored in the ROM 3, the CPU 1 is able to, via the management unit 5, obtain the management data stored in the management data area 81 and determine a state of the storage block 8.

For example, as illustrated at (a) in FIG. 4, it is assumed that a state of a certain storage block 8 is in a state of a block for which erasure has been completed, the block being in a state where all of data in the actual data area 82 thereof have been erased. In that storage block 8, which is the block for which erasure has been completed, as illustrated at (a) in FIG. 5, upon normal operation, only completion-of-erasure management data ("erasure completed") are stored in the fourth (the rightmost) subregion of the management data area 81.

Subsequently, as illustrated at (b) in FIG. 4, the storage block 8, which is the block for which erasure has been completed, becomes a block that is being written, by writing-in-progress management data being stored in the management data area 81 of this storage block 8 and writing of new data into the actual data area 82 thereof being started. When this is done, as illustrated at (b) in FIG. 5, upon normal operation, in the storage block 8, writing-in-progress management data ("writing in progress") are newly stored in the second subregion of the management data area 81 thereof and the management data area 81 is brought into a state where "writing in progress" and "erasure completed" are stored therein.

When writing of the new data to the actual data area 82 is completed, as illustrated at (c) in FIG. 4, by validity management data being stored in the management data area 81 of this storage block 8, this storage block 8 becomes a valid block. That is, as illustrated at (c) in FIG. 5, upon normal operation, in this management data area 81 of this storage block 8, validity management data ("valid") are newly stored in the first (leftmost) subregion of the management data area 81 and the management data area 81 is brought into a state where "valid", "writing in progress", and "erasure completed" are stored. Basically, the latest data are stored in this valid block.

Thereafter, in a case where there is no longer an unwritten area in the storage block 8 being written, or the like, processing to change the block to be written to a new storage block 8 is performed, and when the processing is done and the new storage block 8 becomes the valid block, data stored in the old storage block 8 (old storage block) need to be invalidated (brought into an erasable state). Therefore, as illustrated at (d) in FIG. 4, by storing pre-erasure management data in the management data area 81 of this old storage block 8 and starting collective erasure with respect to this storage block 8 (the management data area 81 and the actual data area 82), this storage block 8 is turned into a pre-erasure block.

When that is done, as illustrated at (d) in FIG. 5, upon normal operation, a state is reached, where pre-erasure management data ("pre-erasure") are stored in the third subregion of the management data area 81 of the storage block 8 and all of the four subregions are filled in.

In a state where the collective erasure with respect to the storage block 8 has been done but processing to bring a storage state of the storage block 8 into a state ("0xFF"), which is an initial state where all is stored with "1", has not been performed yet, as illustrated at (e) in FIG. 4, this storage block 8 is regarded as an indefinite block. No management data are stored in the management data area 81 of this storage block 8 as illustrated at (e) in FIG. 5, and the management data area 81 and the actual data area 82 are both in an indefinite state.

That is, data erasure processing takes a comparatively long processing time among a series of steps of data update processing and stochastically, an instantaneous power failure or the like tends to occur during the data erasure processing. In that case, in a state where the data erasure processing is executed, all of the management data, "valid", "writing in progress", "pre-erasure", and "erasure completed", are supposed to be stored in order from the left in the four subregions of the management data area 81 (see (d) in FIG. 5). However, due to influence of an instantaneous power failure or the like, an indefinite state where the management data are missing may be reached, only "valid" and "pre-erasure" being stored, for example. Such a case is regarded as the indefinite state, as illustrated at (e) in FIG. 5.

When the data erasure processing is completed and processing to bring a storage state of the storage block 8 into the state where all has been stored with "1", which is the initial state, is completed, by storing completion-of-erasure management data in the management data area 81 of this storage block 8 from which the data have been erased, this storage block 8 is turned into a block for which erasure has been completed. That is, the actual data area 82 is in the state where the data have been erased and all has been stored with "1", and erasure in all of the four subregions of the management data area 81 are performed and the completion-of-erasure management data are newly stored into the fourth (rightmost) subregion of the management data area 81 (see (a) in FIG. 5).

Figure 6:
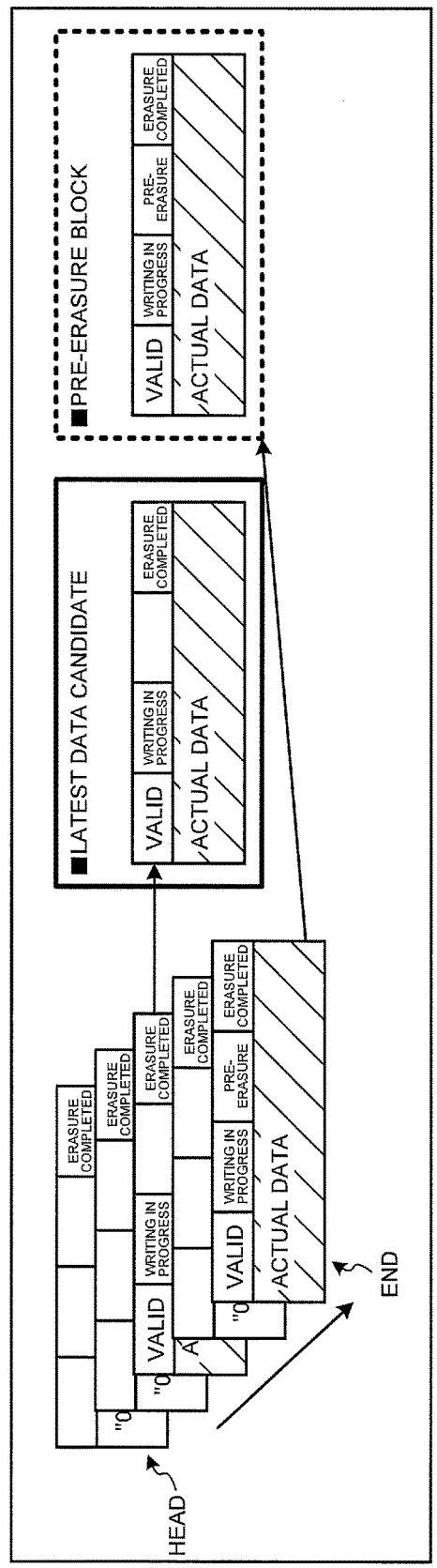
FIG. 6 is a diagram illustrating an example of valid block determination processing according to the embodiment.

Processing of determining a valid clock upon activation, such as a recovery from an instantaneous failure, will be described. FIG. 6 to FIG. 9 are diagrams illustrating an example of valid block determination processing according to the embodiment. Upon activation, as illustrated in FIG. 6, a storage block 8 having "valid" in its management data area 81 is picked up, from the head to the end of the storage blocks 8 included in the flash memory 4, and stored as a latest data candidate. An area to be stored may be a storage area provided as appropriate in the flash memory 4 or may be a work area in the RAM 2.

If the storage blocks 8 having the validity management data in their management data areas 81 include a valid block, which is a storage block 8 (see (c) in FIG. 5) having validity management data ("valid") stored in the first (leftmost) subregion of its management data area 81 and having "valid", "writing in progress", and "erasure completed" stored as the management data therein, this storage block 8 is able to be determined as a storage block 8 having the latest data.

Further, besides the storage block 8 having "valid", "writing in progress", and "erasure completed" stored therein like this, for example, a pre-erasure block (see (d) in FIG. 5), which is a storage block 8 in a pre-erasure state where pre-erasure management data ("pre-erasure") have been stored in the third subregion of the management data area 81 and all of the four subregions have been filled in, is also a storage block 8 having "valid" in the management data area 81 thereof.

Figure 7:
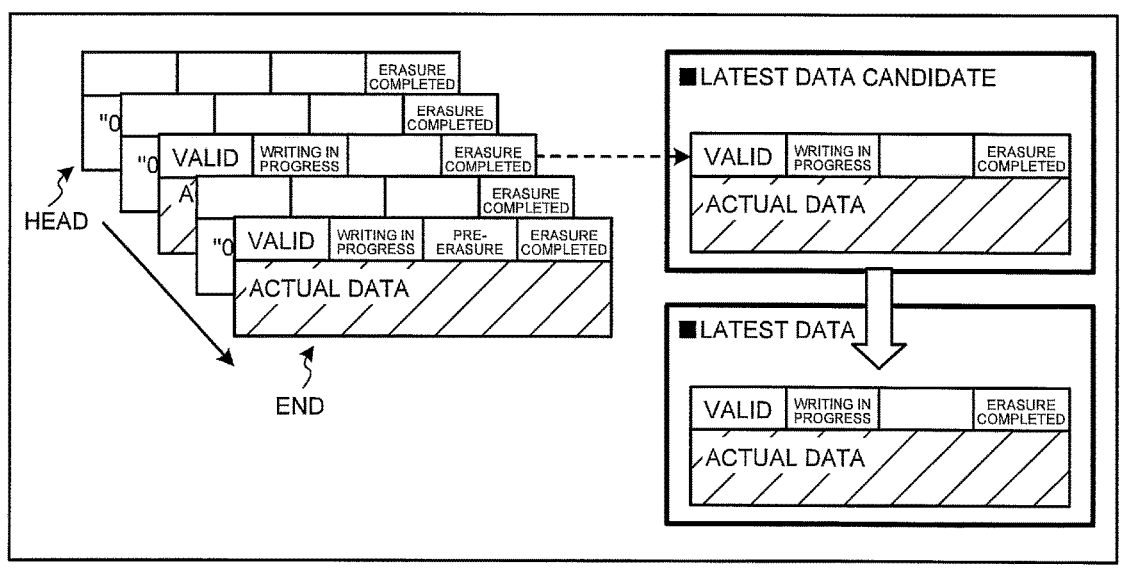
FIG. 7 is a diagram illustrating an example of the valid block determination processing according to the embodiment.

Normally, as illustrated in FIG. 7, a storage block 8 (valid block) having "valid", "writing in progress", and "erasure completed" stored in the management data area 81 thereof and being in a status that is a valid state is determined as the storage block 8 having the latest data, but if a storage block 8 in such a state does not exist, actual data of a storage block 8 (pre-erasure block) having pre-erasure management data may be regarded as the latest data to be updated.

Figure 8:
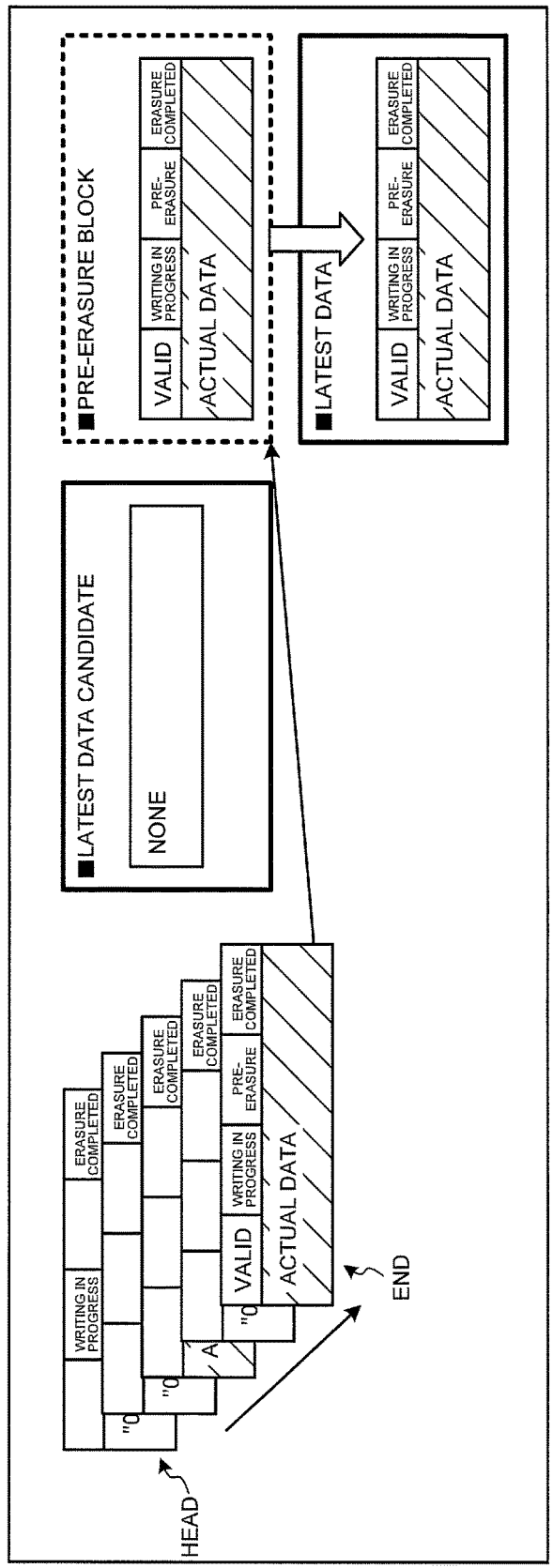
FIG. 8 is a diagram illustrating an example of the valid block determination processing according to the embodiment.

For example, when a storage block 8 (valid block) in a status that is the valid state does not exist and there is nothing to be picked up as the latest data candidate even if all of the storage blocks 8 in the flash memory 4 are searched, there is a possibility that an instantaneous power failure has occurred during processing of changing the block to be written, and thus in such a case, as illustrated in FIG. 8, instead of a new storage block 8 after the change, the new storage block 8 having a possibility that writing of actual data have not been performed normally, a storage block 8 (pre-erasure block) in a pre-erasure state where all of the four subregions of its management data area 81 have been filled in, which is the old storage block 8 before the change, may be regarded as the latest data.

Figure 9:
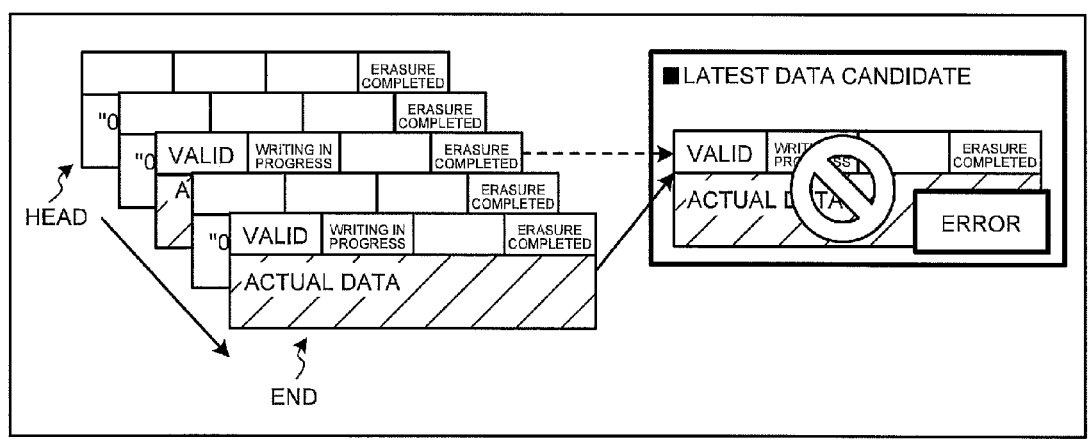
FIG. 9 is a diagram illustrating an example of the valid block determination processing according to the embodiment.

Further, for example, as illustrated in FIG. 9, if a storage block 8 storing therein management data ("valid", "writing in progress", and "erasure completed") indicating that the status is the valid state is detected further, even though the latest data candidate (valid block) already exists (if it is determined that there are two or more valid blocks), this may be regarded as an error. A configuration to notify of an abnormal state in this case is desirably adopted.

As described above, the flash memory 4 according to this embodiment is configured such that the storage block 8 is partitioned into the management data area 81 and the actual data area 82, and the management unit 5 that performs various management operations including writing, reading, and erasure of data with respect to the storage blocks 8 is included.

Further, this management unit 5 causes each of: the writing-in-progress management data stored before start of writing of actual data; the validity management data stored after the writing of the actual data is completed; the pre-erasure management data stored before start of erasure processing of the storage block 8; and completion-of-erasure management data stored after the erasure processing of the storage block is completed, to be stored into the management data area 81 of the storage block 8 as the management data, and when the device is activated or when updating or reading is performed next time, the management unit 5 searches for, based on the respective management data, the storage block storing therein the latest actual data of the normal data.

Therefore, by the flash memory 4 according to this embodiment, even if an instantaneous power failure or the like occurs, after a power recovery, determination of the storage block 8 having the latest data therein or the storage block 8 having bad data therein is enabled and reliability thereof is able to be increased.

Figure 10:
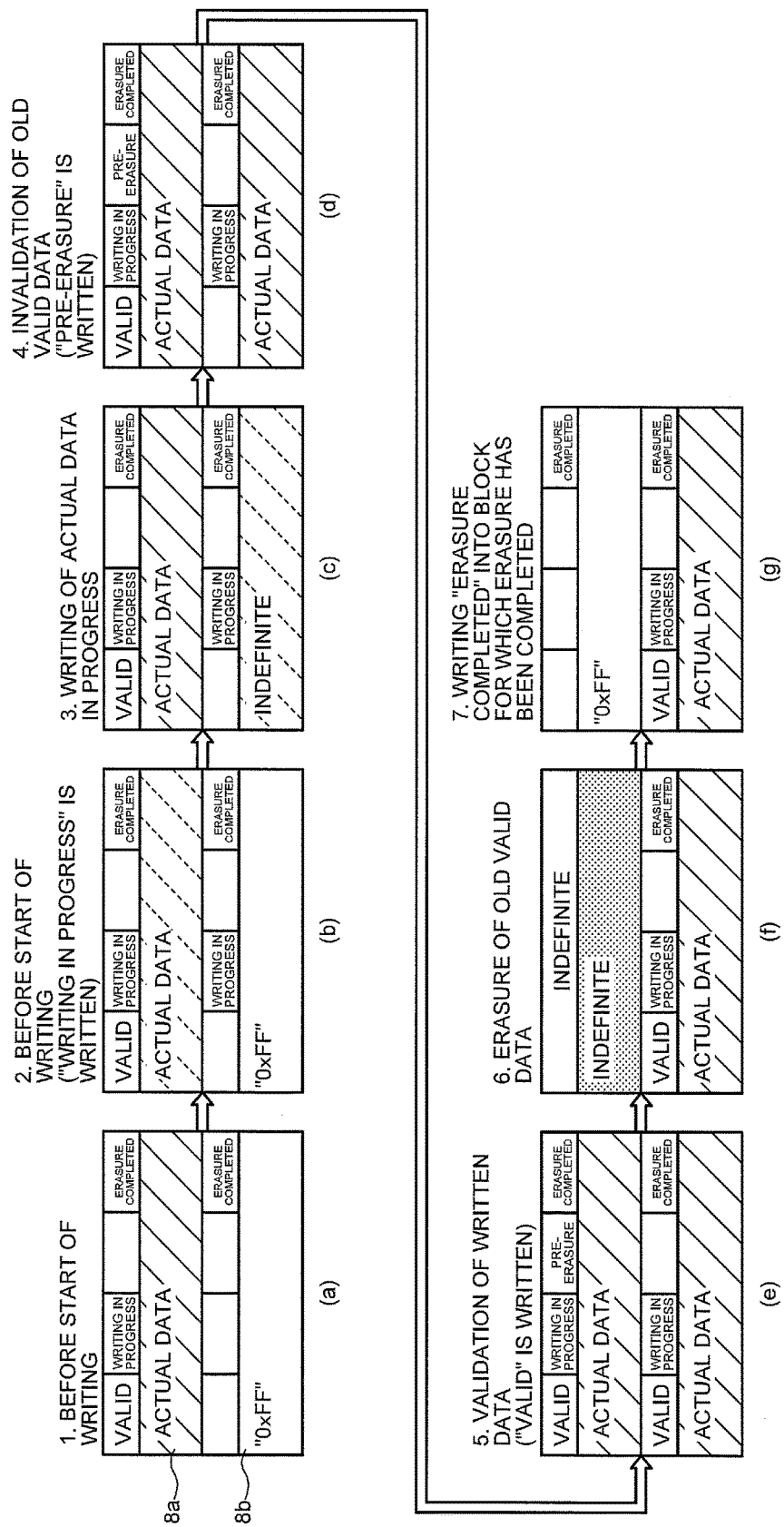
FIG. 10 is a diagram illustrating change of states of storage blocks along with execution of data update processing according to a modified example.

In the above description, basically, the change in the states by the respective processes with respect to a certain storage block 8 has been primarily described, but processes with respect to plural storage blocks 8 are concurrently performed upon change of a target to be written. FIG. 10 is a diagram illustrating change of states of storage blocks 8 along with execution of processing performed concurrently with respect to the plurality of storage blocks 8, and a first storage block 8a storing therein old data and a second storage block 8b newly used are processed as a pair upon writing, in particular upon changing a target to be written, and by use of management data of these, depending on whether or not an improbable combination of management data exists, determination of a storage block 8 having new data therein or a storage block 8 having bad data therein is performed.

As illustrated at (a) to (g) in FIG. 10, the one stored with data already is assumed to be the first storage block 8a and the one into which new data are written is assumed to be the second storage block 8b. As illustrated at (a) in FIG. 10, in a state immediately before start of writing, since actual data are already written in the first storage block 8a, in order from the left subregion in the management data area 81 thereof, respective management data, "valid", "writing in progress", and "erasure completed", which is next but one thereto, are stored. At this time, in the second storage block 8b to be written thereafter, "erasure completed" (completion-of-erasure management data) is stored in the fourth (rightmost) subregion of the management data area 81.

At a time point of start of writing, as illustrated at (b) in FIG. 10, there is no change in the first storage block 8a but in the second storage block 8b, "writing in progress" (writing-in-progress management data) is stored in the second subregion from the left in the management data area 81. That is, "writing in progress" in the second subregion from the left, and "erasure completed" in the rightmost subregion are stored.

During writing into the second storage block 8b, as illustrated at (c) in FIG. 10, there is no change in the first storage block 8a, but the actual data area 82 being written in the second storage block 8b is in an indefinite state. At this time, there is no change in the management data area 81 and "writing in progress" in the second subregion from the left and "erasure completed" in the rightmost subregion are still stored therein.

As illustrated at (d) in FIG. 10, when new data have been written into the second storage block 8b, the data that have been stored in the first storage block 8a are invalidated. That is, as illustrated in the figure, in the management data area 81 of the first storage block 8a, management data of "pre-erasure" are stored in the third subregion from the left that has been empty. In other words, the management data are stored in all of the four subregions.

Subsequently, validation of the second storage block 8b storing therein the new data is performed. That is, as illustrated at (e) in FIG. 10, "valid" is stored in the first (leftmost) subregion in the management data area 81. In the second storage block 8b at this time, like the first storage block 8a illustrated at (a) to (c) in FIG. 10, respective management data, in order from the left subregion, "valid", "writing in progress", and "erasure completed", which is next but one thereto, are stored in its management data area 81.

Thereafter, the old data that have been stored in the first storage block 8a are erased. That is, as illustrated at (f) in FIG. 10, the management data area 81 and the actual data area 82 of the first storage block 8a are both in an indefinite state. On the contrary, there is no change in the second storage block 8b.

As illustrated at (g) in FIG. 10, the storage state of the first storage block 8a is brought into a state ("0xFF") where all is stored with "1", which is the initial state, and "erasure completed" is caused to be stored in the fourth (rightmost) subregion of the management data area 81 in the first storage block 8a from which the actual data have been erased. At this time also, there is no change in the second storage block 8b.

The processing at (f) and (g) in FIG. 10 may be performed continuously after the processing of (b) to (e) in FIG. 10, or may be performed at different timing from (b) to (e) in FIG. 10.

As described above, upon writing, in particular, upon changing of a target to be written, the first storage block 8a and the second storage block 8b are processed as a pair, and according to a combination of the storage states of the management data areas 81 of these storage blocks 8, in which of them data that are usable control-wise are stored is able to be determined.

Further, a case will be described as an example, where the first storage block 8a and the second storage block 8b as described above are processed as a pair with respect to which of the storage blocks 8 is to be read or data of which of the storage blocks 8 need to be erased when an instantaneous power failure occurs during write processing or change processing of a target to be written.

FIG. 11 is a diagram illustrating a relation between the processing described with reference to FIG. 10 and instantaneous failure timing. In the figure, (1) in the field indicating the block state represents the first storage block 8a and (2) represents the second storage block 8b.

In a case that is immediately after reception of a write processing request (including a case where a request to change a target to be written is received, or a case where a storage block to be written has no empty area when writing is attempted upon reception of a write request) and where a processing state is before writing, as a block state, the latest data at that time point are stored as valid data in the first storage block 8a, and from data of the management data areas 81, the first storage block 8a is determined to be a valid block and the second storage block 8b is determined to be a block for which erasure has been performed (see (a) in FIG. 10). If an instantaneous power failure occurs at this time, a storage block 8 to be read after a power recovery is the first storage block 8a, which is the valid block, and in this state, there is no storage block 8 to be subjected to erasure.

Subsequently, when writing into the second storage block 8b is started and the processing state becomes "writing in progress", as the block states, from the data in the management data areas 81, the first storage block 8a is determined to be a valid block and the second storage block 8b is determined to be a block being written (see (b) in FIG. 10). If an instantaneous power failure occurs at this time, the storage block 8 to be read is the first storage block 8a, which is the valid block, and the storage block 8 to be subjected to erasure is the second storage block 8b where the instantaneous failure occurred during the write processing.

Next, when writing of actual data into the second storage block 8b is in progress, as the block states, from the data of the management data areas 81, the first storage block 8a is determined to be a valid block and the second storage block 8b is determined to be a block being written (see (c) in FIG. 10). If an instantaneous power failure occurs at this time, the storage block 8 to be read is the first storage block 8a, which is the valid block, and the storage block 8 to be subjected to erasure is the second storage block 8b where the instantaneous failure has occurred during the write processing.

Next, when the writing of the actual data into the second storage block 8b is completed and invalidation of the old valid data (writing of "pre-erasure") is performed with respect to the first storage block 8a, as the block states, from the data in the management data areas 81, the first storage block 8a is determined to be a pre-erasure block, and the second storage block 8b is determined to be a block being written (see (c) in FIG. 10). If an instantaneous power failure occurs at this time, since a valid block does not exist, the storage block 8 to be read is the first storage block 8a, which is a pre-erasure block and the storage block 8 to be subjected to erasure is the second storage block 8b where the instantaneous failure has occurred during the write processing.

Subsequently, when validation of data to be written into the second storage block 8b (writing of "valid") is performed, as the block states, from the data in the management data areas 81, the first storage block 8a is determined to be a pre-erasure block, and the second storage block 8b is determined to be a valid block (see (e) in FIG. 10). If an instantaneous power failure occurs at this time, the storage block 8 to be read is the second storage block 8b, which is the valid block, and the storage block 8 to be subjected to erasure is the first storage block 8a storing therein the old data, which are no longer in use since the latest data have been stored in the second storage block 8b.

Subsequently, if the processing state is "erasure in progress" of erasing the old data in the first storage block 8a, as the block states, from the data in the management data areas 81, the first storage block 8a is determined to be an indefinite block, and the second storage block 8b is determined to be a valid block (see (f) in FIG. 10). If an instantaneous power failure occurs at this time, the storage block 8 to be read is the second storage block 8b, which is the valid block, and the storage block 8 to be subjected to erasure is the first storage block 8a where the instantaneous failure has occurred during the erasure processing.

When the erasure processing of the old data in the first storage block 8a is completed, from the data in the management data areas 81, the first storage block 8a is determined to be a block for which erasure has been completed and the second storage block 8b is determined to be a valid block (see (g) in FIG. 10). If an instantaneous power failure occurs at this time, the storage block 8 to be read is the second storage block 8b, which is the valid block, but a storage block 8 to be subjected to erasure does not exist in this state.

As a way of switching over the storage blocks 8 to be written, alternate switch-over between two storage blocks 8 may be performed, or a storage block 8 to be written may be changed according to a predetermined rule among three or more storage blocks 8. Further, a method of providing a plurality of groups, each group having storage blocks 8 among which targets to be written are switched over, may be considered, for example. In that case, the order of writing may be set as appropriate.

Figure 13:
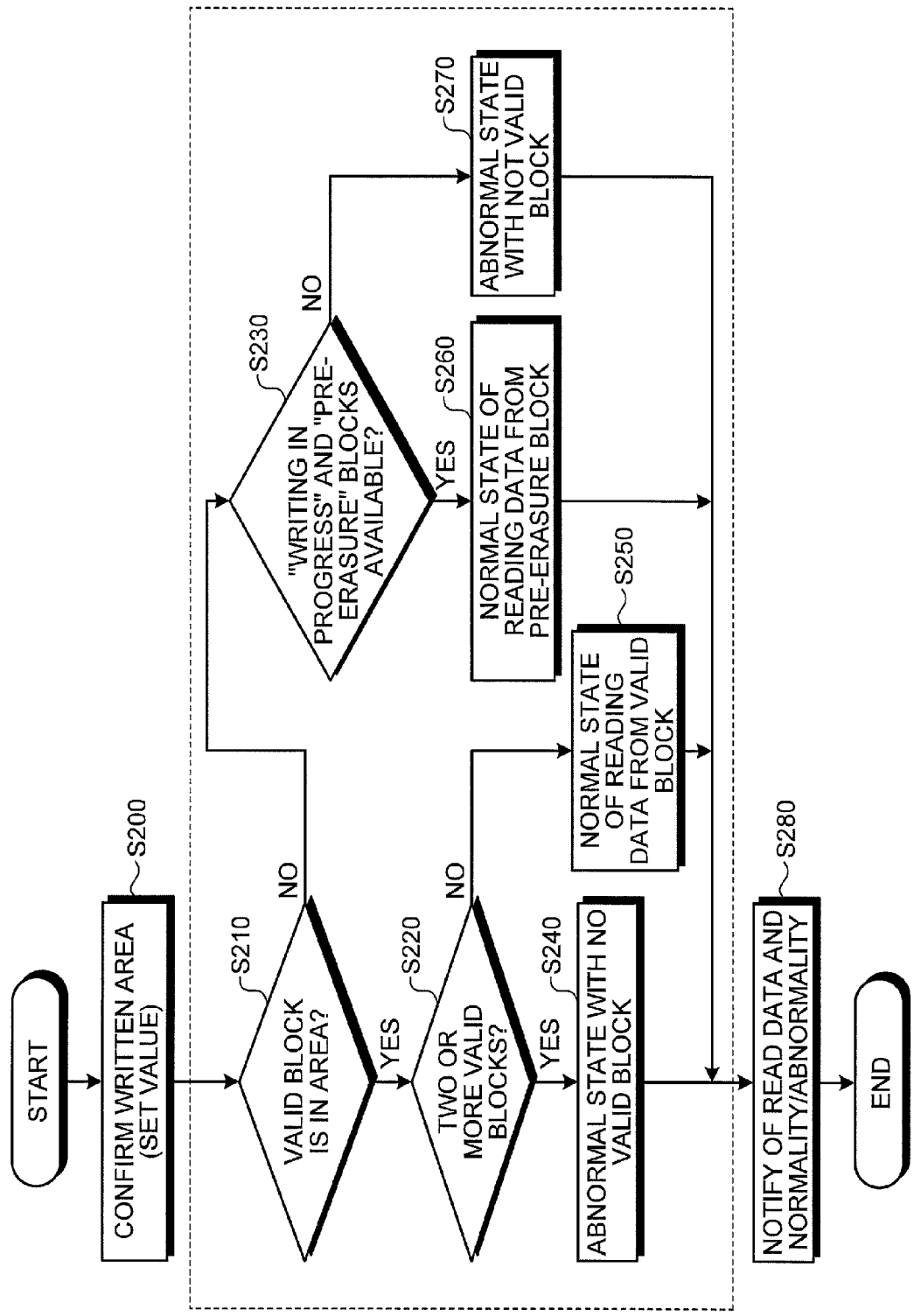
FIG. 13 is a diagram illustrating an example of a flow of read processing according to the embodiment.

By use of FIG. 12 and FIG. 13, write processing and read processing with respect to the flash memory 4 will be described. FIG. 12 and FIG. 13 are diagrams illustrating an example of flows of the write processing and read processing. Herein, the first storage block 8a storing therein the old data is assumed to be a valid block and the second storage block 8b newly used is assumed to be a block to be written.

In the following description, the write processing and the read processing with respect to this flash memory 4 are described as being controlled mainly by the CPU 1, but they may be controlled mainly by the management unit 5 in the flash memory 4.

First, based on FIG. 12, the write processing will be described. When a write command is generated by processing of the application software or the like, based on the flash memory control software 31, the CPU 1 confirms an area to be written as illustrated in FIG. 12 (Step S10). Herein, in which area in the storage area 6 of the flash memory 4 the area to be written where the storage blocks 8 are provided is provided is determined. The area where the area to be written is provided is of a set value that has been determined beforehand.

Subsequently, valid block search processing is performed (Step S20). This valid block search processing is the same as the content of the later described read processing, and thus will be described in detail in the description of FIG. 13, which is an example of the flow of the read processing.

Next, the CPU 1 determines whether or not the valid block determination in the valid block search processing performed in Step S20 was normal (OK) (Step S30). If the valid block determination was abnormal (Step S30: No), the CPU 1 determines that a valid block is not available and according to a predetermined setting, determines a storage block 8 to be a block to be written (Step S40). Herein, for example, of the plurality of storage blocks 8, a storage block 8 having the youngest address may be selected, or a storage block 8 with the least number of times of writing may be selected.

On the contrary, if the valid block determination was normal (Step S30: Yes), a block subsequent to the valid block is regarded as a block to be written (Step S50). That is, the block to be written is, if the n-th block is the valid block, the (n+1)-th storage block 8, of the plurality of storage blocks 8.

Subsequently, it is determined whether or not erasure for the block to be written has been completed (Step S60). If the erasure for the block to be written has not been completed (Step S60: No), the CPU 1 performs erasure for the block to be written. Completion-of-erasure management data are then caused to be stored in the management data area 81 of the block to be written (Step S80).

On the contrary, if the erasure for the block to be written has been completed (Step S60: Yes), the CPU 1 causes writing-in-progress management data to be stored in the management data area 81 of the block to be written (Step S90), and subsequently writes the latest data into the block to be written (Step S100).

Next, the CPU 1 causes pre-erasure management data to be stored in the management data area 81 of the valid block (Step S110), and causes validity management data to be stored into the management data area 81 of the block to be written (Step S120).

Thereafter, the management unit erases the actual data in the valid block (Step S130) and causes the completion-of-erasure management data to be stored in the management data area 81 of the valid block for which the erasure has been completed (Step S140).

Finally, the CPU 1 notifies a source of generation of the write command, such as the application software, that the writing has been completed (Step S150) and ends this processing.

In the above described example, a configuration is adopted, in which every time write processing occurs, storage into a different storage block is performed, but, a configuration may be adopted, in which, if a volume of data needed to be stored in one write process is small with respect to a capacity of the storage block 8, until there is no longer a space in the capacity of the storage block 8 to be written, additional recording is performed into the same storage block 8, and when there is no longer a space in the capacity, the block to be written is changed to the next block.

Next, the read processing will be described based on FIG. 13. If a write command is generated by processing of the application software or the like, the CPU 1 confirms, based on the flash memory control software 31, an area to be written, as illustrated in FIG. 13 (Step S200). This processing of confirming the area to be written is the same as the processing upon reading, and thus description thereof will be omitted.

After confirming (Step S200) the area to be written, the CPU 1 determines whether or not there is a valid block in the area to be written (Step S210). If there is a valid block therein (Step S210: Yes), whether or not there are two or more of the valid blocks is determined (Step S220).

On the contrary, if there is no valid block in the area to be written (Step S210: No), the CPU 1 determines whether or not there is a block being written and a pre-erasure block in the area to be written (Step S230).

Returning to Step S220, if there are two or more valid blocks (Step S220: Yes), since a valid block storing therein the latest data is unable to be determined, a substantially valid block is determined to be "none" and it is determined to be in an abnormal state (Step S240). On the contrary, if it is determined that the number of the valid blocks is not two or more (Step S220: No), it is determined to be in a normal state and data are read out from the valid block (Step S250).

Further, at Step S230, if there are a block being written and a pre-erasure block (Step S230: Yes), the CPU 1 determines it to be in a normal state even if there is no valid block and reads data from the storage block 8, which is the pre-erasure block (Step S260). On the contrary, if a block being written and a pre-erasure block do not exist (Step S230: No), the CPU 1 determines a valid block to be "none" and determines it to be in an abnormal state (Step S270).

Based on respective states of Step S240, Step S250, Step S260, and Step S270, the CPU 1 notifies a source of generation of the write command, such as the application software or the like, of the normality or abnormality and ends this processing.

The contents of the processing surrounded by a dotted line in FIG. 13 (processing contents from Step S210 to Step S270) correspond to the valid block search processing of Step S20 in FIG. 12.

As described above, the flash memory 4 according to this embodiment, which has the plurality of storage blocks 8, and in which, when data in the respective storage blocks 8 are to be updated, while leaving existing data to be updated in a storage block 8 storing therein the existing data, data corresponding to the existing data are written into another storage block and the existing data are erased after ending the writing, is configured by the storage block 8 being partitioned into the management data area 81 and the actual data area 82.

When actual data are to be updated, a control unit, such as the CPU 1, which performs write processing and read processing with respect to the flash memory 4, respectively stores, as management data, into the management data area 81 of the storage block 8: validity management data indicating that writing of the actual data has been completed; writing-in-progress management data indicating that the actual data are being written (writing has started); pre-erasure management data indicating that erasure for the storage block has started (erasure is in progress) and the stored data have been brought into an erasable state (are invalid); and completion-of-erasure management data indicating that the erasure for the storage block has been completed, correspondingly with the partitioned four sub-regions. The management unit 5 then searches, based on the respective management data, for a storage block 8 storing therein the latest actual data, upon the next writing or reading.

Therefore, even if an instantaneous power failure occurs at any timing during data updating, determination of a storage block 8 having therein the latest data or determination of a storage block 8 having therein bad data even if the bad data are generated by the instantaneous failure is able to be easily performed after a power recovery.

Further, a configuration is adopted, in which, when writing of the actual data is performed, the validity management data in the storage block 8 into which the latest data have been written are updated, and thus even if a configuration is adopted, in which writing is performed in irregular order with respect to the plurality of storage blocks 8, rather than a configuration as described with respect to the conventional technique, in which writing is sequentially performed with respect to plural storage blocks 8 in numerical order, after occurrence of an instantaneous power failure during data update, accurate determination of data of which storage block are the usable latest data is enabled.

The configuration in which writing is performed in the irregular order with respect to the plural storage blocks 8 is used in: a case where the number of times of writing in each storage block 8 is actively managed and controlled (the numbers of times of writing are balanced or biased); a case where application to a system in which write requests are generated from plural tasks (a system in which plural types of latest data exist and timing of generation of the write requests differ depending on the tasks) is done; or the like.

Further, in this embodiment, the data storage device was the microcomputer 10 provided in the electronic control unit (ECU), which is an example of the on-vehicle control apparatus, but the data storage device is not limited to this embodiment. For example, it may be any non-volatile memory configured to collectively perform erasure for the original block after writing data into another unwritten storage block when there is no longer an unwritten area in the storage block being written. Any control apparatus may be installed with this data storage device.

Furthermore, in this embodiment, although the management data area 81 and the actual data area 82 are each configured to be provided in the same storage block 8, the configuration is not limited to this embodiment. For example, the management data area 81 may be configured to be provided in a storage block 8 different from a storage block 8 provided with the actual data area 82, or a management data area 81 storing therein data for plural actual data areas 82 may be provided altogether in one storage block 8.

Moreover, further effects and other modified examples may be derived easily by persons skilled in the art. Accordingly, broader aspects of the present invention are not limited to the particular details and representative embodiment presented and described above. Therefore, various modifications may be made without departing from the spirit or scope of the concept of the overall invention defined by the appended claims and their equivalents.

The invention claimed is:

1. A data storage device that performs data storage control, comprising:
   a memory having a plurality of storage blocks each provided with an actual data area storing therein actual data, the memory being not able to overwrite data, and the memory erasing data in units of the storage blocks when the data are erased therefrom; and
   a memory control unit that performs control of at least one of writing and reading with respect to the memory, wherein
   a management data area storing therein management data for management is provided in the memory,
   the management data area is configured to be able to store therein writing-in-progress management data indicating that writing of actual data has started, validity management data indicating that the writing of the actual data has been completed, and pre-erasure management data indicating that stored actual data have been brought into an erasable state, and
   the memory control unit: when storage of actual data into a new storage block that is a new one of the storage blocks is performed,
   performs writing of the actual data into the new storage block after storing writing-in-progress management data into the management data area for the new storage block;
   after the writing of the actual data is completed, stores pre-erasure management data in the management data area for an old storage block that is the storage block where storage of the actual data used to be performed;
   thereafter stores validity management data in the management data area for the new storage block;
   determines a valid block having validity management data stored and no pre-erasure management data stored in the management data area thereof to be the storage block storing therein latest data; and
   determines, when the valid block is determined to not exist, a pre-erasure block having validity management data and pre-erasure management data stored in the management data area thereof to be the storage block storing therein the latest data.

2. The data storage device according to claim 1, wherein when the valid block is determined to not exist, and a pre-erasure block having validity management data and pre-erasure management data stored in the management data area thereof, and a storage block being written having writing-in-progress management data stored but no validity management data stored in the management data area thereof, are determined to both exist, the memory control unit determines that the pre-erasure block is the storage block storing therein the latest data.

3. The data storage device according to claim 1, wherein the memory control unit notifies of being in an abnormal state when more than one storage block having validity management data therein exists in the plurality of storage blocks.

4. The data storage device according to claim 1, wherein the memory control unit distinguishes, based on respective management data of a preset pair of the plurality of storage blocks, between the storage block having the latest data to be updated and a storage block having bad data left therein.

5. An on-vehicle control apparatus, comprising the data storage device according to claim 1.

6. The data storage device according to claim 1, wherein the management data area is configured to be able to further store therein completion-of-erasure management data indicating that erasure of the stored actual data has been completed.

7. A method of storing data into a memory, which has a plurality of storage blocks, for which update by overwrite of data is not possible, and for which erasure needs to be performed in units of the storage blocks when data are erased therefrom, wherein
   a management data area storing therein management data for management is provided in the memory having the plurality of storage blocks each provided with an actual data area storing therein actual data, and the management data area is configured to be able to store therein writing-in-progress management data indicating that writing of actual data has started, validity management data indicating that the writing of the actual data has been completed, and pre-erasure management data indicating that stored actual data have been brought into an erasable state, and
   when storage of actual data into a new storage block that is a new one of the storage blocks is performed, a memory control unit that performs control of at least one of writing and reading with respect to the memory:
   performs writing of actual data into the new storage block after storing writing-in-progress management data into the management data area of the new storage block;
   after the writing of the actual data is completed, stores pre-erasure management data in the management data area for an old storage block that is the storage block where storage of the actual data used to be performed;

thereafter stores validity management data in the management data area of the new storage block;

determines a valid block having validity management data stored and no pre-erasure management data stored in the management data area thereof to be the storage block storing therein latest data; and determines, when the valid block is determined to not exist, a pre-erasure block having validity management data and pre-erasure management data stored in the management data area thereof to be the storage block storing therein the latest data.

* * * * *